United States Patent
Thom

(10) Patent No.: US 6,740,438 B1
(45) Date of Patent: May 25, 2004

(54) COOLING SYSTEM FOR FUEL CELLS

(75) Inventor: Frank Thom, Düren (DE)

(73) Assignee: Forschungszentrum Julich GmbH, Julich (DE)

( * ) Notice: Subject to any disclaimer, the term of this patent is extended or adjusted under 35 U.S.C. 154(b) by 118 days.

(21) Appl. No.: 10/019,390

(22) PCT Filed: Jul. 7, 2000

(86) PCT No.: PCT/EP00/06450
§ 371 (c)(1),
(2), (4) Date: Mar. 1, 2002

(87) PCT Pub. No.: WO01/09969
PCT Pub. Date: Feb. 8, 2001

(30) Foreign Application Priority Data

Jul. 29, 1999 (DE) .......................... 199 35 719

(51) Int. Cl.$^7$ ................................. H01M 8/12
(52) U.S. Cl. ............... 429/26; 429/12; 429/17
(58) Field of Search ............... 429/12, 17, 26

(56) References Cited

U.S. PATENT DOCUMENTS 5,338,622 A * 8/1994 Hsu et al. ............... 429/26

FOREIGN PATENT DOCUMENTS

| DE | 19853911 | | 5/2000 | |
|---|---|---|---|---|
| EP | WO 94/13026 | * | 6/1994 | ............ H01M/8/04 |
| JP | 62237678 | | 10/1987 | |
| JP | 09007624 | | 1/1997 | |
| JP | 9007624 | * | 1/1997 | ............ H01M/8/04 |
| WO | 94/13026 | | 6/1994 | |

* cited by examiner

*Primary Examiner*—Patrick Ryan
*Assistant Examiner*—Dah-Wei Yuan
(74) *Attorney, Agent, or Firm*—Merchant & Gould P.C.

(57) ABSTRACT

The invention relates to a device with a fuel cell or a stack of fuel cells, wherein one electrode of a fuel cell is separated from an adjoining channel or chamber through which an operating substance is supplied by means of a perforated plate. The size and/or the density of the holes increases towards the edge starting from a median line and the median line extends in parallel to the direction of flow of the operating substance. The inventive device more reliably avoids thermal gradients in the interior of the fuel cell or of a stack of fuel cells. In order to prevent the occurrence of temperature gradients, the device is cooled by evaporating a coolant in an external cooling system. The heat is mainly transferred by thermal radiation.

5 Claims, 1 Drawing Sheet

COOLING SYSTEM FOR FUEL CELLS

The invention relates to a fuel cell stack, in which several fuel cells are mechanically and electrically connected together.

Fuel cells are known from DE 44 30 958 C1 as well as from DE 195 31 852 C1, which have a cathode, an electrolyte and an anode. A passage or space adjacent the cathode is supplied with oxidation medium (for example air) and a passage or space adjacent the anode is supplied with fuel (for example hydrogen).

It is understood from DE 197 90 15 256 A1 that a distribution structure is provided in the above-mentioned passages or spaces. The distribution structures are of comb-like shape. This is to cause an even distribution of the working medium in each space.

The working medium reaches as far as the electrodes and is depleted there. Subsequently the depleted working medium flows out again, and is directed out of the fuel cell.

At the cathode of the known high temperature fuel cell of DE 4430 958 A1, anions are formed in the presence of the oxidation means. The anions pass through the solid electrolyte and recombine on the anode side with hydrogen coming from the fuel, to make water. The recombination will liberate electrons and so produce electrical energy. The working temperature of a high temperature fuel cell is typically about 800° C.

At the anode of the known fuel cell of DE 195 31 852 C1 protons are formed in the presence of the fuel by means of a catalyst. The protons pass through the membrane (electrolyte) and combine on the cathode side with oxygen coming from the oxidation medium, to make water. Electrons will be liberated at the anode and consumed at the cathode, so that electrical energy is produced.

In order to achieve good efficiency, the working medium must be distributed evenly in three dimensions in the fuel cell.

The flow of the working medium in the fuel cell must be such as to avoid or nearly to prevent pressure loss. Loss of pressure leads to loss of performance.

In an electrode space of a fuel cell (the space in which the electrode is located) there is, as a rule, a mixture of gases and/or liquids. The combustion gases can be diluted by inert gases. Through reforming and oxidation, a fuel such as a methanol-water mixture can also have a further inert gas such as carbon dioxide present in the relevant electrode space. The cathode will be supplied regularly with air and thereby also with the inert gas nitrogen.

The gases or liquids found at each electrode may be homogeneously mixed together, in order to help performance.

If unhumidified gases, that is, humidified gases not separated in a humidification device, are introduced into a polymer electrolyte membrane fuel cell, the electrode surfaces will be particularly evenly supplied with the working medium. Otherwise, the threat of a local drying up of an electrode and even an electrolyte membrane is increased. Local drying up results in performance loss and can be the cause of damage. The existence of a temperature gradient can cause local overheating of the fuel cell. Local drying-up can then result.

The exhaust flow of the working medium parallel to the electrodes over a lengthy region increases its exhaustion. Accordingly, the exhaust flow reactions are quantitively distinguished, dependent on their location. The result is the appearance of a temperature gradient in a fuel cell.

Thermal gradients are in general to be avoided, as they can result in damage and reduced efficiency, so that the working temperature cannot be maintained at its optimum.

Accordingly, German patent application No. 198 08 331.9-45 has proposed, to solve the above-mentioned problem, the provision of a plurality of supply passages and adjacent exhaust flow passages. These passages have holes, adjacent to the electrodes of the fuel cell. The working medium flows through the holes at right angles to the electrode as well as the interface between the electrolyte and the electrode. In the same way, the outflow is also at right angles to these.

The holes are furthermore of different sizes, to obtain an even distribution of the gases along the electrode surfaces.

The above-described construction is disadvantageous because the plurality of passages is relatively expensive. The desired intermixing is also rather low.

In particular, the low intermixing is a disadvantage because of the appearance of local temperature gradients resulting from the reactions. A temperature differential causes low efficiency, because the working temperature locally differs from the optimum temperature.

The construction also the disadvantage that the separate supply and exhaust passages basically result in a halving of the areas, over which the working medium in the fuel cell or a stack of fuel cells flows. This disadvantage can in fact be balanced by a higher throughput. However, a higher throughput results in a greater pressure loss, and thereby lower efficiency.

The same applies to the areas, over which the depleted working medium flows out of the fuel cell or the fuel cell stack.

In fact, in a fuel cell the path between the separate supply and exhaust passages can be made very small in order to achieve enlarged entry and exit areas. However, this results in a worsening of the electrical contact between the fuel cells of a fuel cell stack and thereby reduced efficiency. A fuel cell stack is made up of several fuel cells, which are mechanically and electrically connected together by connecting elements.

According to a further German patent application, DE 198 53 911.8-45, it has been proposed to separate the electrodes of a fuel cell by a perforated plate in a passage or space adjacent the flat surfaces of the electrode. By a perforated plate is meant a flat member provided with holes. This plate is arranged parallel to the layers of the fuel cell (electrode and electrolyte layers). The corresponding working medium is supplied and exhausted through the adjacent space or passage. The holes in the plate are of macroscopic size, so that they are visible to the naked eye.

In the flow direction of the gases the density and/or the diameter of the holes in particular increase. This results in equal distribution, which leads to electrochemical reactions in the fuel cell being uniformly distributed. The existence of a temperature gradient can therefore be counteracted. In this arrangement the exhaust gas flow is the same as the supply gas flow.

The gases pass through the holes to the adjacent electrode. The gases flow out again uniformly indirectly through a neighbouring hole. In comparison with a fuel cell with separate supply and exhaust passages this achieves stronger intermixing (by swirling). Temperature gradients can therefore be avoided.

In particular in fuel cells which are subject to internal reforming or oxidation reactions, temperature gradients are present. The very rapid reforming reaction is limited in the usual fuel cells to a region of a few millimetres. The reaction is strongly endothermic. Thereby in a particular case of internal reforming, there is large intermixing which has the advantage of increasing the efficiency.

In the above-described implementation, a plurality of divided passages is avoided. The constructional expense is therefore small. It is only necessary to provide, for example, a perforated metal sheet between a connecting element of the fuel cell and the adjacent electrode.

In order to avoid temperature gradients in a fuel cell stack, it has further been proposed to cool a fuel cell by evaporation of a liquid cooling medium. The cooling medium either evaporates in the fuel cell stack, or it is supplied to a cooling device, which is arranged externally and at a distance from the fuel cell stack.

In the above-mentioned state of the art, it is an aim of the invention to provide a fuel cell or a fuel cell stack, in which the temperature distribution in the fuel cell is further improved. The aim of the invention is also the provision of a method for the particularly efficient working of the fuel cell or the fuel cell stack according to the claims.

The aim of the invention is achieved by a device with the features of claim 1. A method of operating the device is shown in the features of the secondary claim. The subsidiary claims describe advantageous developments.

According to the claims, the aim is achieved by a fuel cell stack, which is provided with an external and adjacent cooling device, through which a cooling medium flows. The cooling device is arranged close to the fuel cell stack and constructed so that the heat from the fuel cell stack is mainly transferred through thermal radiation from the fuel cell stack to the cooling line and the cooling medium, thus causing cooling of the fuel cell. The cooling is controlled so that the cooling medium is evaporated by the heat which is removed.

In comparison with the state of the art with the external or internal cooling by evaporation, the claimed construction is simple and inexpensive. In the above-mentioned mode of operation (cooling by evaporation) uniform cooling takes place, so that the temperature of the cooling medium remains constant.

It will be understood that an externally-arranged cooling device means one that is not integrated with the fuel cell stack. An external form of cooling can be compared cooling through endothermic chemical reactions (for example methane reforming reaction in an external plate heat exchanger according to DE 19716438 A1), but cooling by evaporation is preferred. It will be understood by the term evaporation cooling, that a medium is evaporated by heat absorption.

Preferably water is used as the evaporating medium.

On the basis of the external cooling operation by heating up media (gases, liquids), which do not go through a phase change, it appears that the temperature gradients in the fuel cell or in the fuel cell stack increase. An increase in the cooling temperature of the cooling medium accordingly varies the cooling operation. A corresponding temperature gradient appears in the fuel cell or the fuel cell stack.

This undesired effect can be prevented, by cooling through evaporation. The temperature of the cooling medium hardly changes at all. The corresponding cooling performance remains constant. Temperature gradients in the fuel cell or the fuel cell stack are therefore reduced.

The above-mentioned device operates in particular, so that at least 80%, and preferably at least 90%, of the heat given off by thermal radiation from the fuel cell is used for evaporation of the cooling medium. This form of heat transfer is simple and inexpensive in comparison with the heat transfer in the state of the art, in which a cooling medium is transported from the fuel cell to an external evaporator.

The operation of the fuel cell is arranged in particular so that heating of the cooling medium to boiling point or overheating of the evaporating liquid (evaporating cooling medium) does not take place.

In an advantageous development of the invention the fuel cell stack and the cooling device are arranged in a container. In this way a closed system is provided, which is protected from external disturbing influences. The operation of the device is therefore secured to a certain extent.

In a further advantageous development of the invention tubes acting as an evaporator are arranged in a casing or housing with the fuel cell stack. The cooling medium flows through the tubes. The tubes are arranged so that the fuel flows round them, as it enters and/or leaves the fuel cell or the fuel cell stack.

The cooling devices may be arranged horizontally and/or vertically in one or more of the gas supply spaces. By gas supply space will be understood a space arranged adjacent to the fuel cell or fuel cell stack, which supplies the working medium. Near the cooling device it acts preferably as a tube. Evaporating water is preferably used as the cooling medium, whose thermodynamic state is characterised by its wet steam region. Preheating to boiling point or overheating of the cooling medium, for example, water, can therefore not result, and thereby energy must be used in an avoidable way.

Advantageously, the cooling device, which is in particular developed as the evaporator is placed on the longer side of a fuel cell stack with a rectangular plan, as here the greatest flat surface is available. The heat transfer is then particularly large. The working medium comes in and goes out of the fuel cell stack on these longer sides, so that it will flow round these cooling devices, at least partially. The cooling devices, for example the tubes, are preferably made of metal.

The problem can furthermore be solved, in that a fuel cell electrode is separated from the flat surface of the electrode adjacent the passage or space by a perforated plate. A perforated plate is a flat element provided with holes. It is arranged parallel to the layers of the fuel cell (electrodes and electrolyte layers). The corresponding working medium will flow into and out of the adjacent space or passage. The holes or openings in the plate are of macroscopic size, visible to the naked eye.

The holes in the plate which are arranged at the edge of the plate relative to a mid-line of the plate are more densely arranged and/or larger than the holes which are closer to or at the mid-line. The perforated plate thus borders an anode space, so that the flow direction of the fuel runs parallel to the mid-line.

More working medium reaches the adjacent anode space through the larger openings in the perforated plate than through the smaller openings. The working medium will be converted electrochemically in the anode space. Heat is thereby generated. The more working medium that is converted, the greater is the resulting quantity of heat. Thus, by the provision of the claimed perforated plate less heat will be produced in the interior of an anode space than at the edge, because the larger holes allow a greater quantity of working medium to flow into the anode space. This edge of the anode space is situated in the region of the outer surface of a fuel cell or a fuel cell stack. The outer surface of a fuel cell or a fuel cell stack, through cooler surroundings, will be more strongly cooled than the interior of the fuel cell or the fuel cell stack. A temperature gradient in a fuel cell or in a fuel cell stack will thereby be avoided, bringing about a greater exothermic electrochemical consumption of the fuel adjacent the outer surface in comparison with an exothermic electrochemical consumption into the interior of the fuel cell or the fuel cell stack.

Gases also pass through the holes to the adjacent electrode. The gases flow out evenly and indirectly through an adjacent hole. The outflow, in comparison with a fuel cell with separate inlet and exhaust passages, is more greatly intermixed (by swirling). Temperature gradients are thus further avoided.

The constructional expense is small. It is only necessary for example to provide a perforated metal sheet between a connecting element of a fuel cell and the adjacent electrode.

The openings or holes in the perforated plate can be formed as desired. It is only necessary to ensure that the area of the passages in the above-mentioned edge region is greater than the area of the passages close to or at the above-mentioned mid-line. By area of the passages is to be understood the area through which the working medium flows through the perforated plate. It represents thus a sum of the areas of the holes in the claimed plate.

In an advantageous development of the invention the holes in the perforated plate are arranged symmetrically about the mid-line. Such a symmetrical distribution is partly responsible for the avoidance of temperature gradients.

The area of the passages at the edge region may be at least 5%, advantageously at least 20%, greater than the area of the passages close to the mid-line.

In a further advantageous development of the invention, the area of the passages through which a working medium flows through the perforated plate is increased in the flow direction to at least 10%, and preferably at least 100%. Such an increase in the flow direction is described in German Patent Application No. 198 53 911.8-45. This provision of the increased area of the passages will achieve, in addition to the above-mentioned operation, inflow of a working medium, not already in the inlet region completely into the corresponding electrode space. Thus, the continuing chemical reaction is not concentrated at the inlet region. In this way the avoidance of temperature gradients is further achieved.

The perforated plate is preferably made of a high-alloy, high-temperature steel (for example: X8 CrNiMoNb 16 16) or an electrically conducting ceramic (for example: La(Sr, Ca)CrO$_3$). Such materials are suitable in particular for use in a high temperature fuel cell as they are high temperature and corrosion resistant.

In a further advantageous development of the invention the claimed plate is formed as a perforated metal sheet, which is welded to the connecting element (known as a bipolar plate or interconnector) in a fuel cell stack.

The anode spaces of the individual fuel cells are provided with the perforated plate in the above-mentioned manner in the interior of a fuel cell stack.

The perforated plates are made in particular of metal.

The operation of the perforated plate in a fuel cell stack is achieved independently of the evaporation cooling.

The operating temperature can be maintained approximately constant by optimisation of the follow parameters:

1. The distance between the evaporator tubes and the fuel cell stack
2. The number of evaporator tubes
3. The length to width relationship of the plan of a fuel cell stack
4. The dimensions of the area of the passages in the perforated plate.

The skilled person will be able to ascertain the optimal parameters by a few trials.

The invention as illustrated in the Figures will now be further described.

Figure 1:
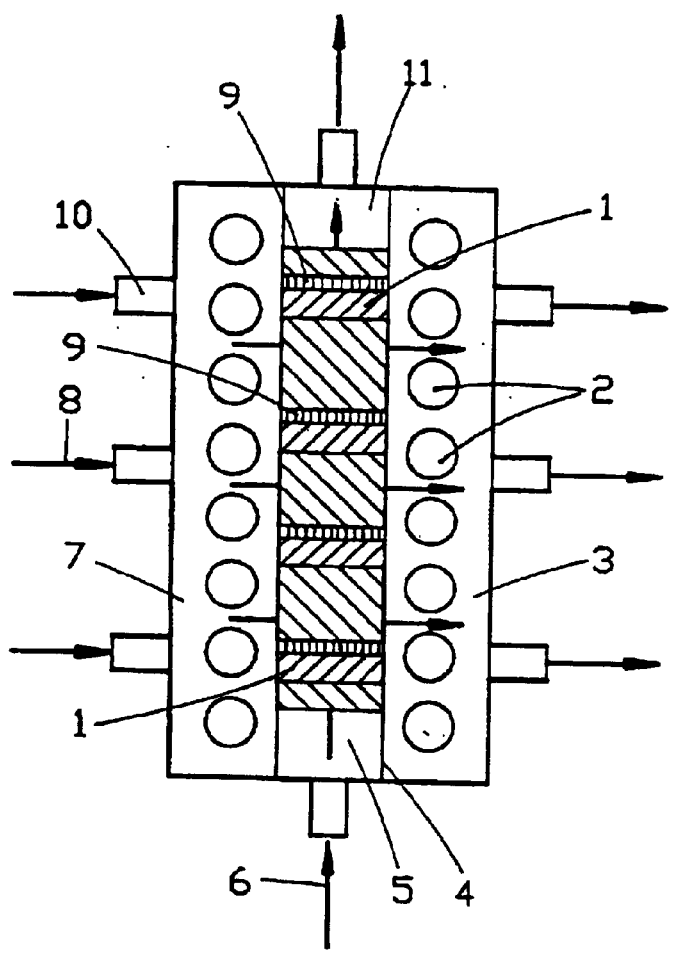
FIG. 1 shows a horizontal section through a fuel cell unit
Figure 2:
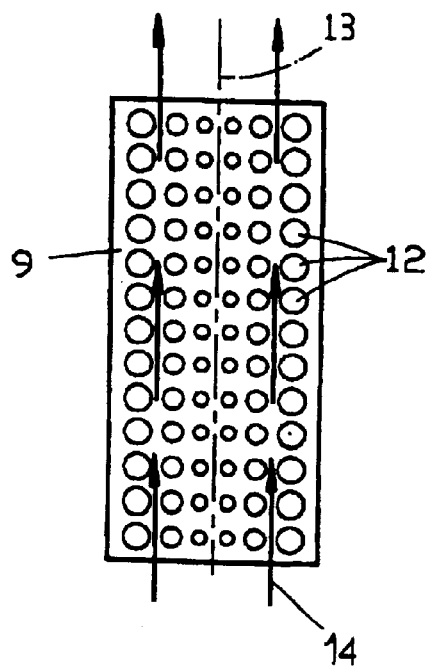
FIG. 2 shows a plan view of a perforated plate with symmetrically arranged openings.

FIG. 1 shows in section a fuel cell stack, consisting of several fuel cells 1. The fuel cells are coupled together electrically and mechanically by connecting elements. Tubes 2 are adjacent to the longer sides of the fuel cell stack. The tubes 2 are shown in cross-section. Cooling medium is conducted through these tubes. The tubes are arranged in an exhaust gas space 3 as well as in an anode gas supply space 7. Separating walls 4 seal in a gas tight manner the anode gas supply space 7, the cathode supply space 5 and the anode gas exhaust space 3 as well as the cathode gas exhaust space 11 from each other. The anode side working medium 8 and the cathode side working medium 6 run perpendicular to each other and are connected by lines 10 to the supply spaces and the exhaust spaces. The tubes 2 are preferably arranged in the anode gas supply space, because in the event of leakage from the tubes, the water vapour released is electrochemically harmless on the anode side. The assumption here is that water is used as the cooling medium. The fuel 8 passes next through a perforated plate 9, before it reaches the anode. One realisation of the perforated plate is illustrated in FIG. 2. The holes 12 are arranged symmetrically to the left-hand and right-hand sides of a mid-line 13. The diameter of the holes 12 increases with increasing distance from the mid-line. The arrows 14 indicate the flow direction of the anode gas.

What is claimed is:

1. A device with a fuel cell stack (1) and an external cooling device, so arranged that the heat from the fuel cells is transferred to the cooling device mainly by thermal radiation, and wherein an electrode of a fuel cell is separated from an adjacent passage or space for supply of a working medium by a perforated plate (9), in which a size and/or density of holes increases from a midline (13) to an edge and the mid-line runs parallel to a flow direction (14) of the working medium.

2. Device according to claim 1, in which the cooling device is formed from tubes (2), whereby the tubes are arranged in a supply space (7) or an exhaust space (3) for fuel.

3. Device according to claim 1, in which the external cooling device and the fuel cell stack are arranged together in a housing.

4. Device according to claim 1, in which the size and/or density of the holes at the edge is at least about 5%, preferably about 20% greater than the size and/or density of the holes close to the midline.

5. Method of operating a device with the features according to claim 1, in which the fuel cell stack is cooled externally by evaporation of a cooling medium in the adjacently-arranged cooling device, whereby the heat from the fuel cells is transferred to the cooling device mainly through thermal radiation.

* * * * *